Figure 1:
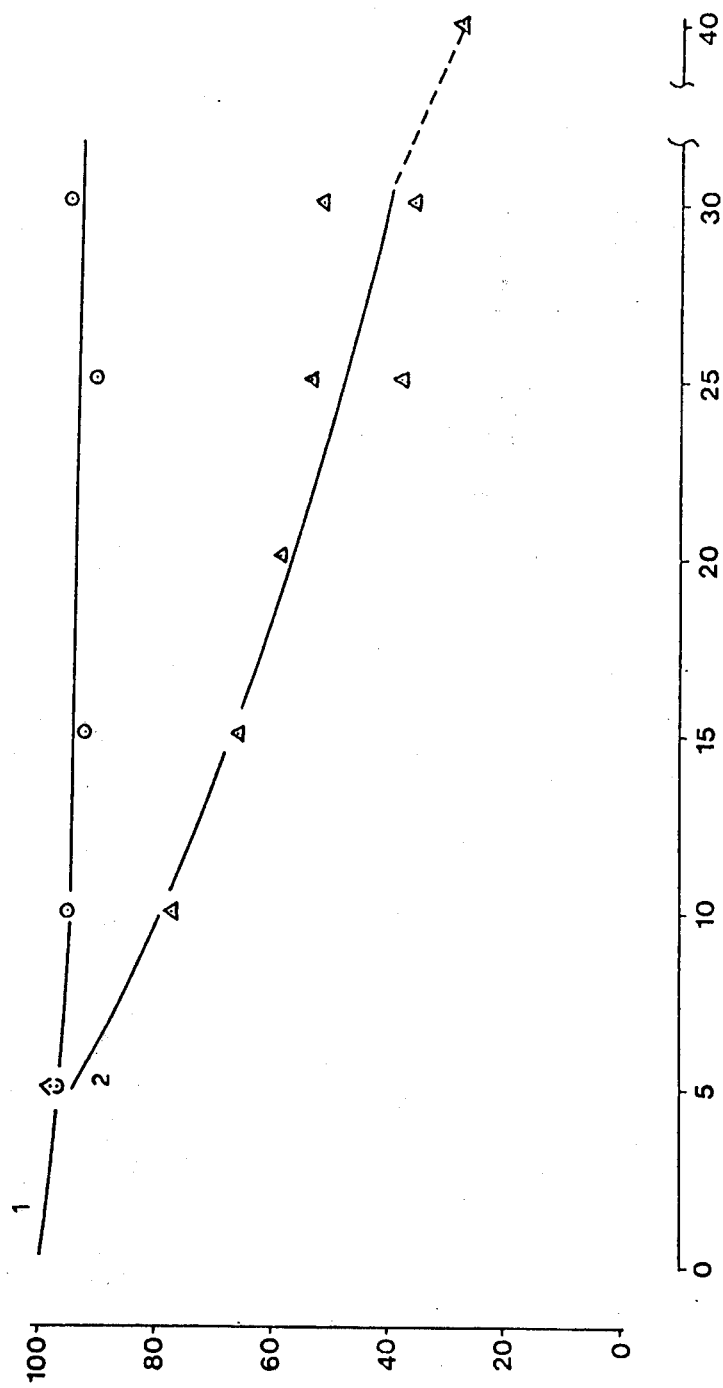

United States Patent [19]

Marconi et al.

[11] 4,042,495
[45] Aug. 16, 1977

[54] METHOD FOR CONDITIONING FRESH AND SEA WATERS FROM OIL

[75] Inventors: Walter Marconi, San Donato Milanese; Nicola Oddo; Ludwig Degen, both of Rome, all of Italy

[73] Assignee: Snam Progetti S.p.A., Milan, Italy

[21] Appl. No.: 630,670

[22] Filed: Nov. 10, 1975

Related U.S. Application Data

[63] Continuation of Ser. No. 460,224, April 11, 1974, abandoned.

[30] Foreign Application Priority Data

Apr. 13, 1973 Italy .................................. 22951/73

[51] Int. Cl.² .............................................. C02B 9/02
[52] U.S. Cl. ..................... 210/11; 195/3 H; 210/38; 210/40; 210/DIG. 27
[58] Field of Search .................. 71/64 F; 195/3 H; 210/2, 11, 36, 40, DIG 26, DIG. 27

[56] References Cited

U.S. PATENT DOCUMENTS

| 3,205,061 | 9/1965 | Mason ................................. 71/64 F |
| 3,607,741 | 9/1971 | Sohnivs ....................... 210/DIG. 26 |
| 3,728,279 | 4/1973 | Salomone ................................ 210/11 |
| 3,769,164 | 10/1973 | Azarowicz .......................... 195/3 H |
| 3,843,517 | 10/1974 | McKinney et al. .................... 210/11 |
| 3,959,127 | 5/1976 | Bartha et al. ........................ 210/11 |

Primary Examiner—Wilbur L. Bascomb, Jr.
Assistant Examiner—Ivars Cintins
Attorney, Agent, or Firm—Ralph M. Watson

[57] ABSTRACT

Oily hydrocarbons which pollute the surface of water are removed therefrom by scattering over the polluted surface solid particles of nutrient salt containing nitrogen and phosphorous in a form that is readily assimilable by aqueous microorganisms capable of metabolizing hydrocarbons. The particles of nutrient salt are given a surface pretreatment with paraffine so that they are buoyant and only slowly soluble in water and lipophilic.

3 Claims, 1 Drawing Figure

METHOD FOR CONDITIONING FRESH AND SEA WATERS FROM OIL

This is a continuaton of application Ser. No. 460,224 filed April 11, 1974, now abandoned.

The invention relates to the microbiologic removal of pollution from shores, fresh water and seawater caused by crude oil and hydrocarbons. Moreover the invention relates to the preparation of a medium promoting the growth of natural microorganisms capable of oxidizing hydrocarbons and crude oil.

The known processes for the removal of oil pollutions from a water surface consist, for the most part, in scattering absorbing agents such as straw, silicates, synthetic substances, etc. upon the polluted surface.

Other methods employ surface-active agents or consist in scattering mixtures of microorganisms in case absorbed on inert carriers, capable of metabolizing the components of crude oils.

Some substances such as straw, sawdust, etc. collect the crude oil, float and can be then recovered whereas others, such as silicates, sink together with the absorbed oil. It is obvious that such a method causes a large amount of hydrocarbons to be stored on the bottoms, which are thus polluted; moreover the absorbed oil may be slowly set free in the long run.

The surface-active agents, i.e. the large amounts necessary for obtaining a good dispersion of the crude oil, remove the hydrocarbons only transitorily besides often being toxic with respect to the water fauna and flora of the water.

It is known that the sea microflora contain several microbial species (aqueous microorganisms) capable of metabolizing most of the hydrocarbons constituting the oil polluting the water, however the velocity and the rate of this biological process are limited by factors such as the too low ambient temperature, the low concentratin of assimilable nitrogen and phosphorus compounds, the narrow crude-water contact surface.

In seawaters the content of nitrogen compounds (ammonium nitrates and salts) depends on the season, the distance from earth and the depths, ranging from 10 to 500 mg/m$^3$. The low content of phosphorus compounds is partially due to the low solubility of many phosphates at the alkaline pH of the seawaters and ranges from 10 to 100 mg/m$^3$.

As a consequence an enrichment of the natural flora with bacterial cultures has but a poor effect because the low concentrations of nitrogen and phosphorus compounds are factors limiting their growth.

From laboratory tests it is known that the biodegradation of oils is increased by suitable fertilizers such as ammonium salts, nitrate and phosphates. The simple addition of these salts to the polluted water cannot be performed in nature, not even in closed and small deep water basins, because the added salts, even if in large amounts, scatter within a short time.

Our invention resides in the composition and the method of preparation of floatable, lipophilic particles of nutrient salts, containing nitrogen and phosphorus compounds, and the employment of said particles of nutrient salts in the water to effect biological removal of oily compounds arising from hydrocarbons.

It has been found, which is a first aspect of the present invention, that it is possible to render compounds or mixtures of compounds containing nitrogen and phosphorus buoyant and slowly soluble in water, in a form the aqueous microorgainisms can absorb, by means of a simple treatment with paraffins.

As nitrogen containing compounds use may be made of ammonium salts, nitrates, or urea and as phosphorus containing compounds use may be made of soduim, potassium, or ammonium phosphates, superphosphate or magnesium ammonium phosphate. An important advantage resulting from the use of magnesium ammonium phosphate consists of the fact that this salt is only slightly in water and gives rise to the deposit which develops, slowly and in a long run, ammonium and phosphate ions the microorganisms can easily absorb.

Another important feature of the invention process is constituted by the treatment with paraffins.

The paraffin, besides rendering the nutrient salt particles buoyant, causes the surface to become lipophilic, which ensures a fast adhesion of the crude oil to the particle and, consequently, increases the buoyancy.

Moreover it stops the immediate dissolution and the dispersion of the nutrient salts so that it promotes the formation of a micro-enviroment around a nutrient salts-crude oil agglomerate and allows a wide colonization of microorgainsims on the crude-oil surface.

Optionally, again according to the present invention, use may be made of porous tables containing nitrogen and phosphorus compounds, made lipophilic by paraffin treatment of the surface.

To this end we prepared tablets containing nitrogen and phosphorus compounds as noted above mixed with ammonium bicarbonate. Ammonium bicarbonate, which, after the compression of the mixture, is decomposed and gives gaseous ammonia and $CO_2$ by a thermal treatment carried out between 80° and 100° C, makes it possible to obtain tablets having a specific gravity lower than 1. Therefore ammonium bicarbonate is employed, according to the nutrient salts and the desired tablet specific gravity, at concentrations ranging from 45 to 60% (weight/weight).

Moreover it has been found, which is another aspect of the present invention, that it is possible to impregnate inert carriers with compounds containing assimilable nitrogen and phosphorus and to render these particles buoyant over the long run by treating the surface with paraffins. As porous and inert carriers use may be made of pumice-stone, agriperlite, perlofon, vermiculite or other silicates, and also alumina.

The impregnation process can be easily performed. Saturated solutions are prepared containing the nourishing salts, the carriers are impregnated in a rotative drier under vacuum and the drying is performed in the temperature range of from 60° to 180° C. In the same apparatus the paraffin treatment is then peformed. According to the aforesaid processes it is possible to remove rapidly pollution of a water surface caused by hydrocarbons and crude oils.

The compounds prepared according to our invention can be stored for a very long time, are not toxic, can be easily conveyed to the place of use and be easily scattered over the polluted surfaces.

An important advantage of this invention consists of the fact that the nourishing compounds quicken a natural process for the biodegradation of the polluting agents without affecting any ecology equilibrium, for instance entropy process, according to a mechanism which can be summarized as follows: the lipophilic particles of the nourishing salts adhere to and mix with the oily pollutants, the salts are slowly solubilized and give rise to an environment having a higher content of nourishing salts. The bacteria of the natural aqueous flora, because of the polarity, grow in the contact-surface and form surface-active metabolism agents. The movement of the water and the wind break the crude-oil aggregates after a short time and form an emulsion, wherein the microbial attack is further promoted.

A further important advantage of the application of the abovesaid processes in free a water surface from hydrocarbons and crude oils is due to the fact that no employed compound can give rise to a subsequent water pollution such as, for instance, "sinkers", synthetic absorbing or dispersing agents, etc. After use there are residues constituted, in the case of porous materials, by minerals already present in the natural environment.

The foregoing and other operating characteristics will be more clearly understood by examining the following examples, reported for the sake of better illustrating the invention, without limiting the purposes thereof.

The drawing shows the results of example 1.

EXAMPLE 1

8 g of magnesium ammonium phosphate ($MgNH_4PO_4 \cdot 6H_2O$) were suspended in 50 ml of ethyl ether containing 2 g of a paraffin mixture having a melting point in the range of 58°–60° C. The ether was then removed in a Rotavapor under vacuum. 25 mg of the aforesaid granulated composition were added to 500 ml flasks containing 100 ml of unsteril sea water (drawn near to the Ostia (Rome) shore) and 40 mg of "SARIR" crude oil.

The flasks were incubated at 15° C under a rotating stirring (100 rounds per minute and 5 cm eccentricity). At the start and every 5 days thereafter the crude oil residue was determined by a $CCl_4$ extraction according to the method described in "Revue de l'Institut Francais du Petrole" 9, 419 (1966).

Formalin was added to some flasks in order to destroy the microbial flora and to detect any possible decrease of the crude oil owing to evaporation. Also flasks containing only sea water and crude oil, but no nourishing salt, were used for the sake of comparison.

The obtained results are illustrated by the graph of FIG. 1 wherein the ordinates refer to the residual crude oil in % and the abscissae refer to the time in days.

The line 1 refers to a control while the curve 2 refers to the same material treated according to the invention

| CRUDE OIL LIBIA SARIR | | |
|---|---|---|
| Specific gravity at 15° C | | 0.8395 |
| Flowing point | ° C | + 19 |
| Paraffin (B.P. 237) | %w | 18.2 |
| Asphaltenes | %w | 0.40 |
| Total sulphur | %w | 0.16 |
| Characterization factor | K | 12.4 |

EXAMPLE 2

Starting from a mixture constituted by

| | |
|---|---|
| $CaHPO_4 \cdot 2H_2O$ | 20 g |
| $NaNO_3$ | 100 g |
| $NH_4HCO_3$ | 120 g | tablets were prepared according to known methods having a 3 mm diameter and a 2–3 mm thickness. The ammonium bicarbonate was then decomposed at 80° C in an oven and tablets were obtained having the specific gravity of 0.9.

8 g of tablets were suspended in 50 ml of ethyl ether containing 2 g of a paraffinic mixture (melting point 58°–60° C).

The ether was removed in a Rotavapor under vacuum.

6 tablets prepared as aforesaid, containing about 80 mg of $NaNO_3$ and 16 mg of $CaHPO_4 \cdot 2H_2O$, were added to 500 ml flasks containing, as in example 1, 100 ml of sea water and 40 mg of crude oil SARIR.

The flasks were incubated for 25 days at 15° C under a rotating stirring (100 rounds per minute and 5 cm eccentricity) and, in the extract, we found 22.65 mg of crude oil, residue corresponding to a 43.4% consumption.

EXAMPLE 3

An aqueous solution was prepared containing urea at 2% and $Na_2HPO_4 \cdot 12H_2O$ at 1%.

100 ml of such a solution together with 5 g of pumice-stone 6/8 were put in a 500 ml flask wherein a 15-20 mmHg vacuum was kept over about 15 minutes. The impregnated pumice was collected and dried under vacuum at 55° C over 24 hours.

1 g of pumice absorbed 0.7 ml of the salt solution.

5 g of this carrier impregnated by the nourishing salts and dried were suspended in 50 ml of ethyl ether, containing 2 g of paraffins (melting point 58°–60° C). The ether was removed in a Rotavapor.

1 g of pumice-stone prepared as aforesaid was added to 500 ml flasks, containing 100 ml of sea water and 40 mg of crude oil SARIR. The flasks were incubated for 24 days at 15° C under a rotating stirring (100 rounds per minute, 5 cm eccentricity) and in the extract, we found 15.1 mg of crude oil residue corresponding to a 62% consumption.

What we claim is:

1. The method of removing oily hydrocarbons from the surface of water which is polluted thereby and which contains aqueous microorganisms capable of metabolizing said oily hydrocarbons, which comprises dispersing over said polluted surface particles comprised of one or more solid nutrient salts selected from the group consisting of ammonium salts, ammonium nitrates, urea, sodium phosphates, potassium phosphates, ammonium phosphates, superphosphate, magnesium ammonium phosphate, and mixtures thereof, said particles having a surface coating of paraffin sufficient to cause the salts to be slowly soluble and to render the particles buoyant in water and lipophilic.

2. A method of claim 1 wherein the nutrient salts are absorbed by an inert carrier selected from the group consisting of pumice-stone, vermiculite, perlofin, agriperlite, silicates and alumina.

3. A method of claim 1 wherein the nutrient salt is magnesium ammonium phosphate.

* * * * *